May 30, 1972 — E. G. OBEDA — 3,666,602
APPARATUS FOR JOINING THERMOPLASTIC MEMBERS BY
SONIC OR ULTRASONIC ENERGY
Original Filed March 7, 1969 — 2 Sheets-Sheet 1
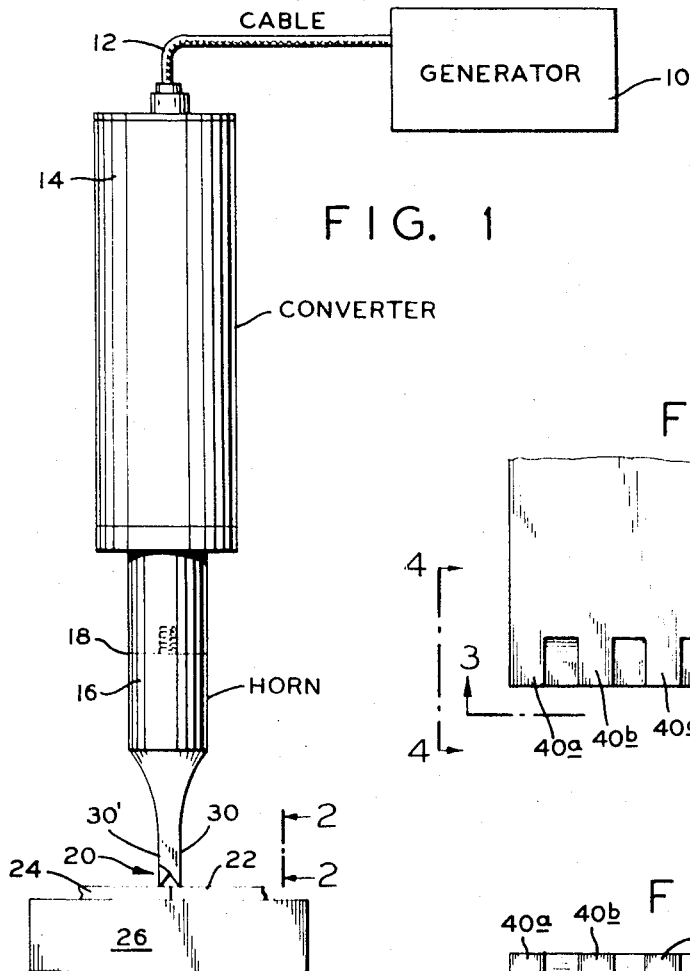
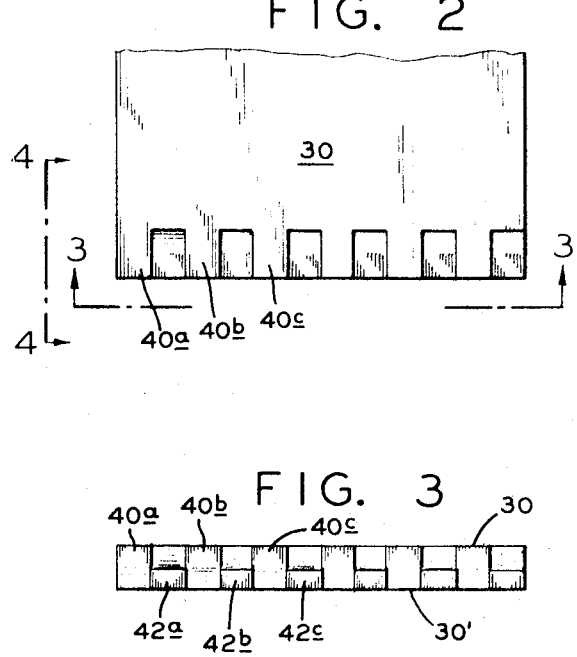
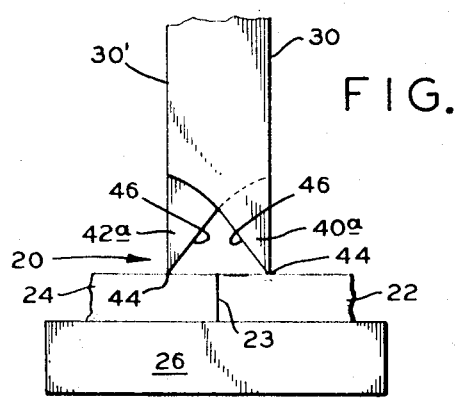
INVENTOR.
EDWARD G. OBEDA
Ervin B. Steinberg

*INVENTOR*
EDWARD G. OBEDA

United States Patent Office 3,666,602
Patented May 30, 1972

3,666,602
APPARATUS FOR JOINING THERMOPLASTIC MEMBERS BY SONIC OR ULTRASONIC ENERGY
Edward G. Obeda, Brookfield, Conn., assignor to Branson Instruments, Incorporated, Stamford, Conn.
Original application Mar. 7, 1969, Ser. No. 805,206, now Patent No. 3,577,292, dated May 4, 1971. Divided and this application Mar. 25, 1970, Ser. No. 25,618
Int. Cl. B29c 27/08; B32b 31/16
U.S. Cl. 156—580                           5 Claims

ABSTRACT OF THE DISCLOSURE

Juxtaposed thermoplastic members abutting along a common interface surface are joined by contacting both members with a sonically or ultrasonically vibrating horn having tooth-like protrusions at its output end. The protrusions are caused to penetrate through the surface of each member and, responsive to the dissipation of energy, cause softened material which is urged to flow across the interface surface to provide, upon hardening, a joint.

---

This application is a division of copending application for Letters Patent Ser. No. 805,206, filed Mar. 7, 1969 now U.S. Pat. No. 3,577,292, dated May 4, 1971.

This invention refers to a method and apparatus for joining two juxtaposed thermoplastic members which are in abutting relation and, more particularly, has reference to a method and apparatus for joining two juxtaposed thermoplastic members by sonic or ultrasonic energy. Quite specifically, this invention has reference to joining two thermoplastic members by sonic or ultrasonic energy, such members being in juxtaposed relation as contrasted with a superposed relation.

This invention, moreover, refers to a solid horn for use with a converter operating in the sonic or ultrasonic frequency range and having an output surface specifically shaped for joining two juxtaposed thermoplastic members, such output surfaces being provided with tooth-like protrusions for engaging substantially simultaneously both thermoplastic members and urging softened thermoplastic material to flow across the interface surface along which both members abut each other.

The joining or fusing together of superposed thermoplastic members under the influence of sonic or ultrasonic energy is well known in the art, see for instance U.S. Pat. No. 2,633,894, issued to P. B. Carwile, dated Apr. 7, 1953 entitled "Plastic Welding" and U.S. Pat. No. 3,324,-916, issued to R. S. Soloff et al., dated Dec. 21, 1965 entitled "Sonic Method of Welding Thermoplastic Parts."

Generally, the two thermoplastic members to be joined or welded together by a fusion joint are superposed on each other and energy in the sonic or ultrasonic frequency range is applied to one of the members, such energy being then conducted to the interface between both members to cause thereat a softening and flowing of the thermoplastic material. Upon the cessation of the sonic or ultrasonic energy application, the softened thermoplastic material hardens and a fusion joint between the members is attained. The acoustic energy in the sonic or ultrasonic frequency range is provided most expediently by an electrical high frequency generator which is connected to a converter unit for converting the electrical energy applied to acoustic energy. A solid horn, mechanically connected to the converter, acts as the coupling member between the sonic energy converter and the workpiece, transferring the acoustic energy of suitable magnitude from the converter to the workpiece.

The present invention concerns a method for joining two thermoplastic members which are in juxtaposition and abutting relationship along a common interface surface. Preferably, the exposed surfaces of the respective abutting members are in a common plane so that a sonically or ultrasonically vibrating horn can be brought into substantially simultaneous contact with both members and, responsive to the dissipation of sonic energy and the generation of softened thermoplastic material, such softened material can be urged to flow across the common interface surface.

The invention concerns also the specific construction of a solid horn adapted to resonate as a half wavelength resonator and having an output surface provided with tooth-like protrusions, for penetrating into the surfaces of two juxtaposed thermoplastic members for causing, responsive to the dissipation of sonic energy, softened thermoplastic material, and for urging such softened material to flow across the interface surface which separates the two members.

One of the principal objects of this invention is, therefore, the method of joining two juxtaposed thermoplastic members which are in abutting relation along a common interface surface.

Another important object of this invention is the method of joining two juxtaposed thermoplastic members which are in abutting relation along a common interface surface by sonic or ultrasonic energy.

Another important object of this invention is the provision of a solid horn for sonic or ultrasonic energy operation and having an output surface provided with tooth-like protrusions.

Another and further object of this invention is the provision of a solid horn adapted to resonate as a half wavelength resonator when receiving sonic energy of predetermined frequency and being provided with an output surface having two opposing rows of tooth-like protrusions for penetrating into the respective surfaces of two juxtaposed thermoplastic members and urging softened thermoplastic member to flow across the interface surface disposed between the two members.

Further and still other objects of this invention will be more clearly apparent by reference to the following description when taken in conjunction with the accompanying drawings, in which:

FIG. 1 is a schematic view of the apparatus and objects disposed for practicing the instant method;

FIG. 2 is a side elevational view taken along line 2—2 in FIG. 1;

FIG. 3 is a bottom plan view of the output surface of the horn when viewed along line 3—3 in FIG. 2;

FIG. 4 is a side elevational view of the output end of the horn viewed along line 4—4 in FIG. 2;

Figure 5:
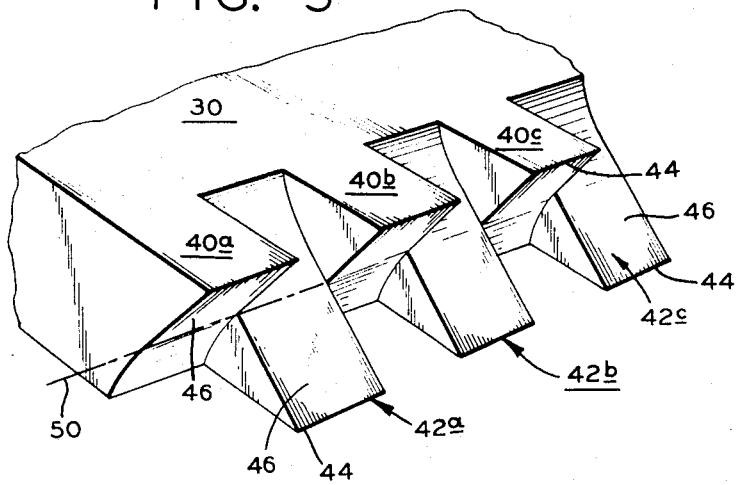
FIG. 5 is a perspective view of a portion of the output surface of the horn.
Figure 6:
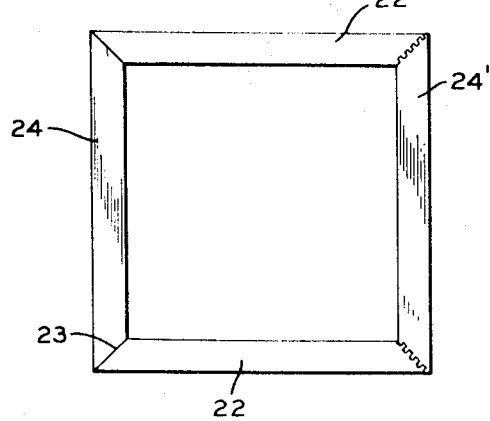
FIG. 6 is a plan view showing juxtaposed members which may be joined along their interface surfaces by the method described.

Referring now to the figures and FIG. 1 in particular, numeral 10 identifies an electrical high frequency generator which provides electrical energy via a cable 12 to an ultrasonic energy converter 14. The converter is provided with one or more piezoelectric disks for converting the electrical energy applied to acoustic energy in the sonic or ultarsonic frequency range. The converter, in a practical embodiment, is constructed as shown for instance in U.S. Pat. No. 3,328,610, issued to S. E. Jacke et al., dated June 27, 1967 entitled "Sonic Wave Generator." Also, the generator 10, cable 12 and converter 14 are available as a standard commercial product, such as the Model J-32 Ultrasonic Welder made by Branson Sonic Power Company of Danbury, Conn.

Typically, the generator 10 and the converter 14 are designed to operate in the ultrasonic frequency range, such as 20 kHz., but it shall be understood by those skilled in the art that a higher or lower frequency may be used without deviating from the scope of the present invention. For instance, the frequency might be below 16 kHz. which is normally considered to be the sonic frequency range. The advantage of the ultrasonic frequency range operation resides in the fact that the noise factor is less disturbing to operating personnel and, moreover, the resonant wavelength decreases with increasing frequency, thus ultrasonic units are less massive than sonic units.

The converter 14 is fitted with a solid horn 16, the latter receiving its acoustic energy at an input surface 18 and providing energy in the sonic or ultarsonic frequency range, depending on the frequency selected, at an output end 20. The horn, also known as impedance transformer or amplitude transformer, is essentially a metallic bar made of steel, aluminum or titanium and designed to operate as a half-wavelength resonator at the predetermined frequency. The design of such a solid horn is described for instance in the book by Julian R. Frederick entitled "Ultrasonic Engineering," John Wiley & Sons, New York, N.Y. (1965), pages 87-103.

Below the output surface 20 of the horn 16 there are disposed two juxtaposed thermoplastic members 22 and 24 which are supported on an anvil 26. The two members 22 and 24, disposed in juxtaposition, are in abutting relation along a common interface surface 23, see FIG. 4.

The horn 16 at its input surface 18 is of circular cross-section and after continuing with this cross-section for approximately one-quarter wavelength at the resonant frequency, becomes of reduced diameter to assume a bar shape, which is essentially a rectangular cross-section exhibiting two opposite longer sides 30 and 30' and two shorter sides.

The frontal end 20 of the horn has an output surface which comprises a plurality of tooth-like protrusions extending in a forward direction toward the area occupied by the thermoplastic members to be joined. As best seen in FIGS. 2, 3, 4 and 5, there are two rows of tooth-like protrusions, such as the protrusions 40a, 40b and 40c being disposed in one row, and the protrusions 42a, 42b and 42c being arranged in the opposing row. Each of the protrusions terminates in a tip 44, see FIGS. 4 and 5, and has an inclined surface 46 which slants from the tip of a respective protrusion toward the base of such protrusion in a direction toward the opposite row of protrusions. It may be noted also that the inclined surfaces 46 of the protrusions of one row, such as those of the protrusions 42a, 42b and 42c, are disposed in a common plane, whereas the inclined surfaces of protrusions belonging to the opposite row are disposed in another plane, and that both of these planes intersect each other along a line as is indicated by the dashed partial line 50 in FIG. 5. This intersecting line is disposed about medially between the base and the tip of the protrusions.

The respective tooth-like protrusions, each of substantially triangular cross-section may be formed by a milling operation whereby the inclined surfaces 46 are readily provided. The inclined surfaces are inclined relative to the longitudinal axis of the horn 16 and the purpose of this arrangement will become more clearly apparent from the following description of the process of joining two members.

Figure 8:
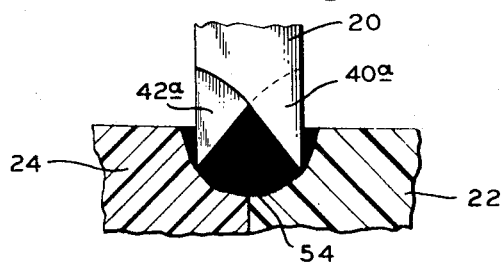
FIG. 8 is an enlarged cross-sectional view showing the flow of softened material across the interface surface between two juxtaposed members.

The method of joining two juxtaposed thermoplastic members will be apparent by reference to FIGS. 1, 4, 6, and 8. The generator 10 provides electrical energy to the converter 14 which in turn causes the horn 16 to become resonant at the predetermined frequency, in the sonic or ultrasonic frequency range, causing the output surface 20 to vibrate mechanically at maximum amplitude along the longitudinal axis of the horn. The thermoplastic members to be joined, such as the members 22, 22', 24 and 24', for instance a picture frame, are brought into juxtaposition so that the members 22 and 24 are substantially in contact with each other along a common interface surface 23. For best results, the upper surfaces of the members 22 and 24 are disposed in a common plane. The output surface 20 of the vibrating horn is then lowered upon the juxtaposed members 22 and 24, see FIG. 4, so that the interface surface 23 is approximately midway between the rows of tooth-like protrusions, that is, the two rows of protrusions straddle the interface 23. While the horn is vibrating, the horn with its protrusions is urged to penetrate through the surface of the members 22 and 24, the dissipation of sonic energy causing a softening of thermoplastic material in each of the members 22 and 24. As the protrusions penetrate further into the members 22 and 24, the softened thermoplastic material 54, FIG. 8, is urged to flow across the interface surface 23 by virtue of the respective inclined surfaces 46 of each protrusion. Moreover, the inclined surfaces cause the members 22 and 24 to be urged into intimate contact along the interface surface 23, thus aiding in closing any gap which may exist between both members.

Figure 7:
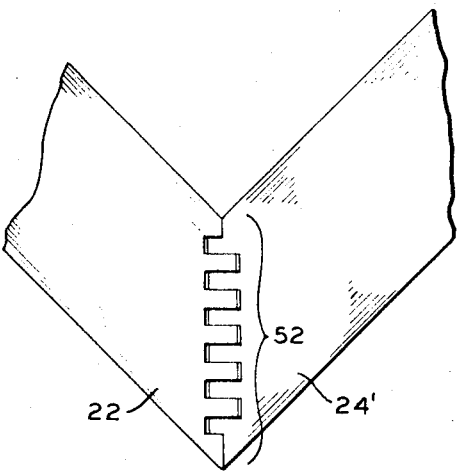
FIG. 7 is an enlarged view of a joint provided in accordance with the present disclosure.

Upon achieving the desired penetration in the juxtaposed members, the sonic or ultrasonic energy is shut off, whereupon the softened and flowed material hardens to provide a fusion joint at the location where material was caused to flow across the abutting contact, see numeral 54, FIG. 8. Subsequently, the horn is withdrawn from contact with the members 22 and 24. Alternatively, the horn may be withdrawn somewhat earlier, that is, before the softened and flowed material has completely hardened in which case the voids made by the horn's protrusions are partially filled as is shown by the appearance of the joint 52 in FIG. 7. It may be noted on inspecting the appearance of the joint per FIG. 7 that softened material from the abutting members has been moved across the common interface surface and that, by virtue of the staggered tooth-like protrusions, a spaced interlocking material pattern has been achieved, that is, material alternately is flowed from one member to the other.

It is evident, therefore, that a method and apparatus have been developed for joining thermoplastic members which are in juxtaposition as opposed to members which are in superposed relationship. The present process lends itself most suitably for joining flat panels, frame parts, bezels, and many other structural members where a side-by-side relationship exists. In an actual embodiment thermoplastic members approximately 1 inch wide by ⅛ inch thick have been joined using ultrasonic energy at 20 kHz. and a commercial unit of the type described. A joint can be achieved with ultrasonic energy transfer of less than one second. Assuming an additional dwell time of one or two seconds, it will be apparent that a joint can be made every few seconds without any need for clamping or fixturing. The method and apparatus described significantly extend the use of sonic or ultrasonic energy in the assembly of thermoplastic parts.

What is claimed is:

1. A solid horn for operating on a thermoplastic workpiece or the like under the influence of sonic or ultrasonic energy comprising:

a metallic bar adapted to resonate as a half wavelength resonator when receiving such energy of predetermined frequency at an input surface and to provide such energy at an opposite output surface to a workpiece with which said bar is in contact;

said output surface including a row of tooth-like protrusions, each protrusion of substantially triangular cross-section including at least one surface inclined relative to the longitudinal axis of said bar and being adapted to penetrate into such workpiece when said bar is resonating and its output surface in forced contact with the workpiece, whereby said inclined surface causes a lateral displacement of workpiece material engaged thereby.

2. A solid horn as set forth in claim 1, said output surface including two spaced parallel rows of tooth-like protrusions.

3. A solid horn for operating on a thermoplastic workpiece or the like under the influence of sonic or ultrasonic energy comprising:

a metallic bar adapted to resonate as a half wavelength resonator when receiving such energy of predetermined frequency at an input surface and to provide such energy at an opposite output surface to a workpiece with which said bar is in contact;

said output surface including two spaced rows of tooth-like protrusions, each protrusion including at least one surface inclined relative to the longitudinal axis of said bar and being adapted to penetrate into such workpiece when said bar is resonating and its output surface in forced contact with the workpiece, and said protrusions of said respective rows being staggered with respect to each other;

whereby said inclined surface causes a lateral displacement of workpiece material engaged thereby.

4. A solid horn for operation on a thermoplastic workpiece, the latter comprising two members abutting along an interface surface, comprising:

a metallic bar adapted to resonate as a half wavelength resonator when receiving sonic energy at an input surface and providing such energy at an opposite output surface;

said output surface including a plurality of tooth-like protrusions aligned along two facing rows, each protrusion having an inclined surface which inclines from the tip of a respective protrusion to the base thereof in a direction toward the opposite row, whereby the output surface of said horn is adapted to be placed upon a workpiece in a manner that the tips of said protrusions of the respective rows straddle said interface surface and, responsive to the dissipation of sonic energy and said output surface of said horn being urged into the workpiece, the respective inclined surfaces urge material to flow across said interface surface for joining said members.

5. A solid horn as set forth in claim 4, said bar being dimensioned for operation at a frequency above 16 kHz.

References Cited
UNITED STATES PATENTS

| | | | |
|---|---|---|---|
| 3,483,067 | 12/1969 | Staats et al. | 156—580 |
| 3,442,733 | 5/1969 | Vilcins | 156—580 X |
| 3,367,809 | 2/1968 | Soloff | 156—73 |

BENJAMIN A. BORCHELT, Primary Examiner

J. J. DEVITT, Assistant Examiner

U.S. Cl. X.R.

28—1; 156—73